United States Patent
Banginwar et al.

(10) Patent No.: US 7,281,144 B2
(45) Date of Patent: Oct. 9, 2007

(54) POWER MANAGEMENT IN COMMUNICATION DEVICES

(75) Inventors: Rajesh P. Banginwar, Hillsboro, OR (US); Eugene Gorbatov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 454 days.

(21) Appl. No.: 10/778,535

(22) Filed: Feb. 17, 2004

(65) Prior Publication Data

US 2005/0181840 A1 Aug. 18, 2005

(51) Int. Cl.
*G06F 1/26* (2006.01)
*G06F 1/32* (2006.01)

(52) U.S. Cl. ............ 713/320; 713/300; 713/310; 713/321; 455/127.1; 455/127.5; 455/522; 455/574; 370/252; 370/318

(58) Field of Classification Search ............ 455/127.1, 455/127.5, 522, 574; 370/252, 318; 713/300–340
See application file for complete search history.

(56) References Cited

U.S. PATENT DOCUMENTS

| | | | | |
|---|---|---|---|---|
| 5,517,649 A * | 5/1996 | McLean | ............ | 713/323 |
| 5,768,508 A * | 6/1998 | Eikeland | ............ | 709/202 |
| 5,900,026 A * | 5/1999 | Ryu | ............ | 713/320 |
| 6,058,102 A * | 5/2000 | Drysdale et al. | ............ | 370/252 |
| 6,553,501 B1* | 4/2003 | Yokoe | ............ | 713/320 |
| 6,567,416 B1* | 5/2003 | Chuah | ............ | 370/418 |
| 6,587,878 B1* | 7/2003 | Merriam | ............ | 709/224 |
| 7,062,303 B2* | 6/2006 | Guterman | ............ | 455/574 |
| 2003/0210658 A1* | 11/2003 | Hernandez et al. | ............ | 370/311 |
| 2004/0153676 A1* | 8/2004 | Krantz et al. | ............ | 713/300 |

OTHER PUBLICATIONS

Author unknown, definitions for the words "contain" and "include" obtained from http://dictionary.reference.com/, 2 pages.*

* cited by examiner

Primary Examiner—Thomas Lee
Assistant Examiner—James F. Sugent
(74) Attorney, Agent, or Firm—Venable LLP; James R. Burdett

(57) ABSTRACT

Actual power savings achieved by using a power savings mode in a communications device may be increased by analyzing the effects of the power savings mode on delays and using the analysis on which to base a decision as to whether or not to enter the power savings mode.

11 Claims, 4 Drawing Sheets

POWER MANAGEMENT IN COMMUNICATION DEVICES

BACKGROUND OF THE INVENTION

A communication system in a device participating in a communication network may be capable of entering a power saving mode. For example, such a power saving mode (PSM) is included in the Institute of Electrical and Electronics Engineers (IEEE) 802.11 wireless local area network (WLAN) standard (e.g., IEEE std. 802.11a, b, d or g, of, e.g., version IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc.). The idea behind such a PSM is to reduce power consumption in a device during periods of inactivity by placing much of the communication system of the device in a low-power, or "sleep", state. Control of power consumption may be of particular interest in wireless devices, particularly battery-powered devices, where power consumption control may extend battery life.

However, when a communication system of a device is in such a PSM, other devices, for example, an access point in the case of an IEEE 802.11-based WLAN, may need to buffer information destined for that device until the device comes out of the PSM. Therefore, while there may be significant reduction in power usage during a PSM period, such a PSM may result in significant delays. Due to such delays, the overall result may be that the device may have to be in an active mode for a longer period of time, to receive and process the buffered information, than would have been necessary if it had not been in the PSM. As a result, what appears at first glance to be a savings in power may ultimately result in the use of a greater amount of power when the device as a whole is considered.

BRIEF DESCRIPTION OF THE DRAWINGS

Various embodiments of the invention will now be described in connection with the associated drawings, in which.

DETAILED DESCRIPTION OF EMBODIMENTS OF THE INVENTION

Figure 1:
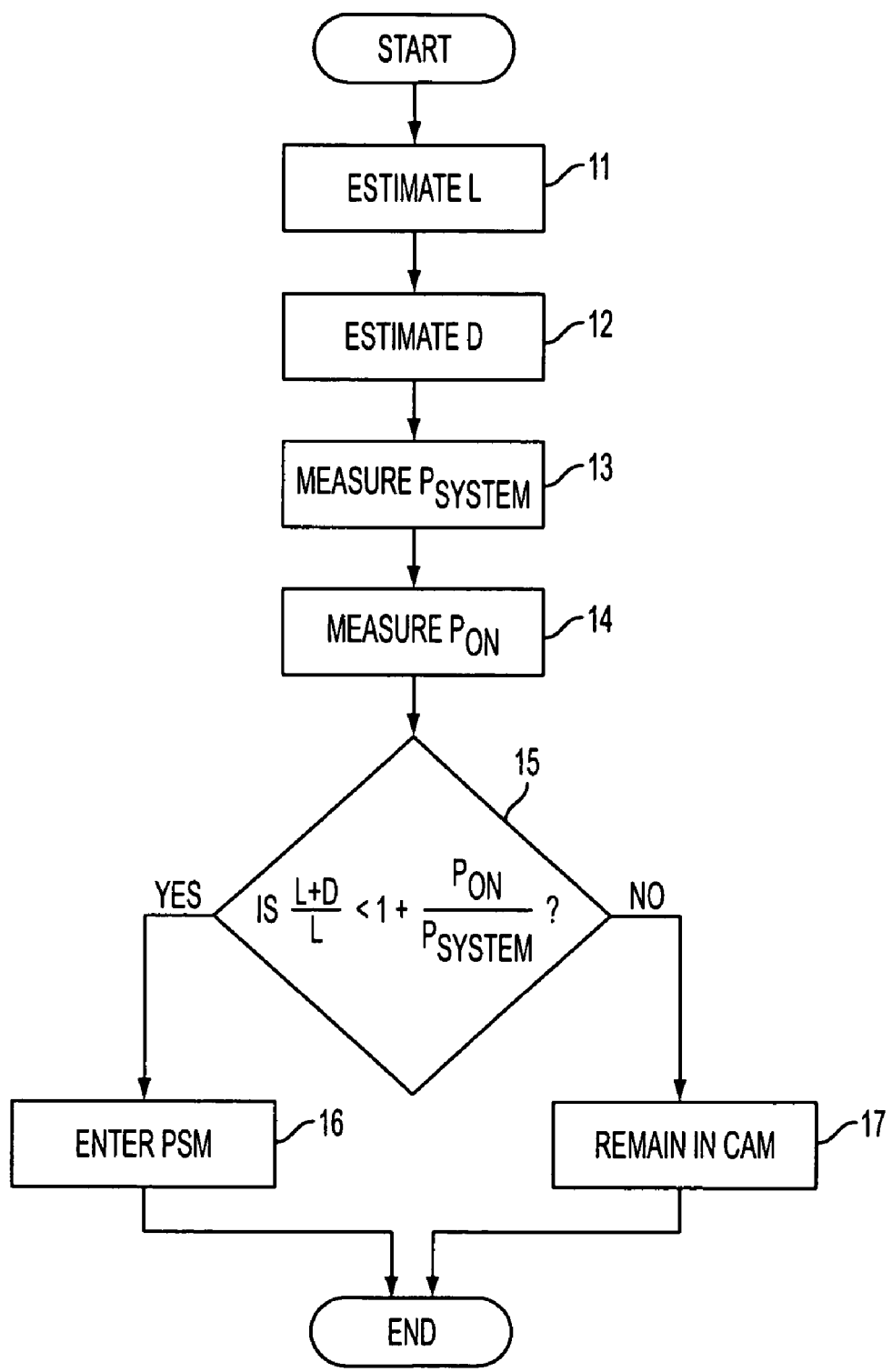
FIG. 1 depicts a flowchart of an exemplary embodiment of the invention.

In the following description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-accessible medium, which may be read and executed by a computing platform to perform the operations described herein. A machine-accessible medium may include any mechanism for storing or transmitting information in a form readable by a machine (e.g., a computer). For example, a machine-accessible medium may contain read only memory (ROM); random access memory (RAM); magnetic disk storage media; optical storage media; flash memory devices; and others.

Note that, in the remainder of this discussion, "PSM" may be used to refer to any power saving mode, and "CAM" may be used to refer to any non-PSM, i.e., these are not to be understood as being limited to referring to the IEEE 802.11 standard.

FIG. 1 depicts a flowchart of an exemplary embodiment of the invention. The embodiment of FIG. 1 may be based on the principle that a PSM should be entered only if the overall power consumed by the device in the case of its communication system remaining in a CAM is greater than the overall power consumed if a PSM is used. One may quantify this criterion in the following manner.

First, the following variables may be defined:

$E_{Tx}$ Energy needed to transmit a request;
$E_{Rx}$ Energy required to receive a response;
L Network latency between sending a request and receiving response;
D Delay introduced by a PSM;
$P_{system}$ Power consumption of the device excluding a network interface subsystem;
$P_{on}$ Power consumption of a network interface subsystem when its transceiver is on;
$P_{idle}$ Power consumption of an network interface subsystem in a sleep/idle state.

Using this analytical model, the energy, $E_{CAM}$, required for a network activity when the card constantly remains in a high-power state may be defined as follows:

$$E_{CAM} = E_{Tx} + E_{Rx} + L*(P_{system} + P_{on}).$$

Similarly, the energy, $E_{PSM}$, required for a network activity when the card is in a PSM may be defined as follows:

$$E_{PSM} = E_{Tx} + E_{Rx} + (L+D)*(P_{system} + P_{idle}).$$

As noted above, the decision whether or not to enter a PSM may depend on whether the overall system power requirements are reduced. This criterion maybe expressed in the following form: $E_{PSM} < E_{CAM}$ or $$E_{Tx} + E_{Rx} + (L+D)*(P_{system} + P_{idle}) < E_{Tx} + E_{Rx} + L*(P_{system} + P_{on});$$

$$(L+D)*(P_{system} + P_{idle}) < L*(P_{system} + P_{on});$$

$$\frac{L+D}{L}*(P_{system} + P_{idle}) < (P_{system} + P_{on}).$$

One may consider the quantity, $$\frac{L+D}{L},$$

to be a relative delay, RD, introduced by a PSM. Using this notation, and simplifying the above expression, may result in an expression of the following form:

$$RD < \frac{1 + P_{on}/P_{system}}{1 + P_{idle}/P_{system}}.$$

If one notes, further, that the quantity, $P_{idle}/P_{system}$, may generally be small, this expression may be approximated in the following form:

$$RD < 1 + \frac{P_{on}}{P_{system}}.$$

Note that, if desired, referring back to the definition of RD discussed above, this may be expressed in the alternative form:

$$\frac{D}{L} < \frac{P_{on}}{P_{system}}.$$

The above expressions may be implemented in the flowchart depicted in FIG. 1. In particular, in block 11, the process may estimate L, the network latency between sending a request and receiving a response or between receiving two consecutive responses. The expected value of L may be calculated, for example, based on historical data of network accesses, or by any other known method.

In block 12, the process may estimate D, the delay introduced by entering the PSM. As discussed above, D may include network delay due to buffering; however, it may further include additional delays, for example, but not limited to, transition delays between power states. D may, similarly to L, be estimated based on historical data or by any other known method.

In blocks 13 and 14, the process may determine, respectively, $P_{system}$ and $P_{on}$. These quantities may, in some embodiments of the invention, be predetermined quantities and thus not measured each time a decision is to be made regarding whether or not to enter a PSM.

In block 15, the process may perform the above-described test, i.e., determining whether or not $$RD < 1 + \frac{P_{on}}{P_{system}}.$$

Alternatively, in some embodiments, the test may take the form, $$\frac{D}{L} < \frac{P_{on}}{P_{system}}.$$

If the test of block 15 is satisfied, the process may continue to block 16. In block 16, a PSM may be entered. Otherwise, the process may continue to block 17, and the system may remain in a CAM.

Figure 2:
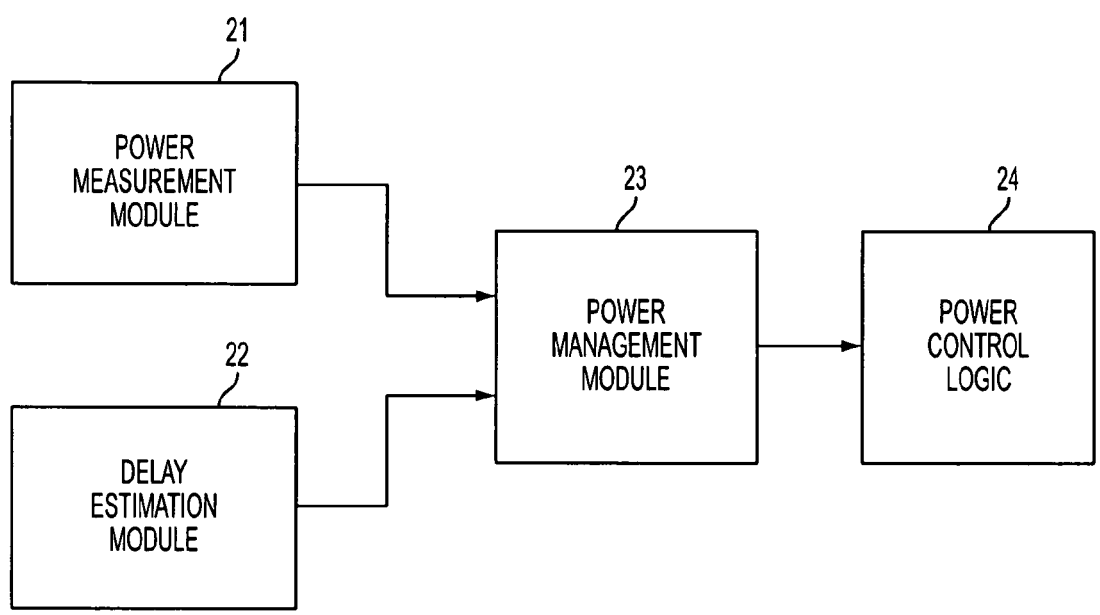
FIG. 2 depicts a conceptual block diagram of a system implementing an exemplary embodiment of the invention.

FIG. 2 depicts an apparatus according to an embodiment of the invention. The apparatus may include a power measurement module 21, which may determine $P_{system}$ and $P_{on}$. As discussed above, these quantities may be predetermined. In fact, power measurement module 21 may update the powers on a constant or near-constant basis, may re-determine them periodically, or may predetermine them and store them. Alternatively or additionally, power measurement module 21 may comprise one or more machine-accessible media storing the values of $P_{system}$ and $P_{on}$.

The apparatus may further include a delay estimation module 22. The delay estimation module may determine an expected delays, L and D, as discussed above. Again, these may, for example, be determined based on historical data.

The powers determined by power measurement module 21 and the delays determined by delay estimation module 22 (or equivalently, a delay ratio as used in the above-described formulas) may be fed to power management module 23. Power management module 23 may compare a delay ratio, as discussed above, with a function of the powers, also as discussed above, and may determine whether or not the system should to into a PSM. The results of this comparison may be used to control power control logic 24, which may control a communication system of a device to be in a CAM or a PSM.

In performing its determination as to whether or not to enter a PSM, power management module 23 may employ a process in which the system is kept in a CAM until there is some assurance that going into a PSM will not result in use of more power than remaining in a CAM. To do so, power management module 23 may, for example, compute the power ratio (i.e., the right-hand side of the inequality above) and may then define a delay bound to be met in order to obtain a power benefit.

For example, in an IEEE 802.11-based WLAN, this may take the following form. When a packet is transmitted, the system may remain in a CAM until it can be reasonably assured that the time before the next beacon will not exceed a delay defined by the delay bound. If this is found to be true, the system may then enter a PSM.

While the block diagram of FIG. 2 has been discussed in terms of "modules" and "logic," it should be understood that each of the blocks of FIG. 2 (21, 22, 23, 24) may be implemented in the form of hardware, software, firmware, or combinations thereof.

Figure 3:
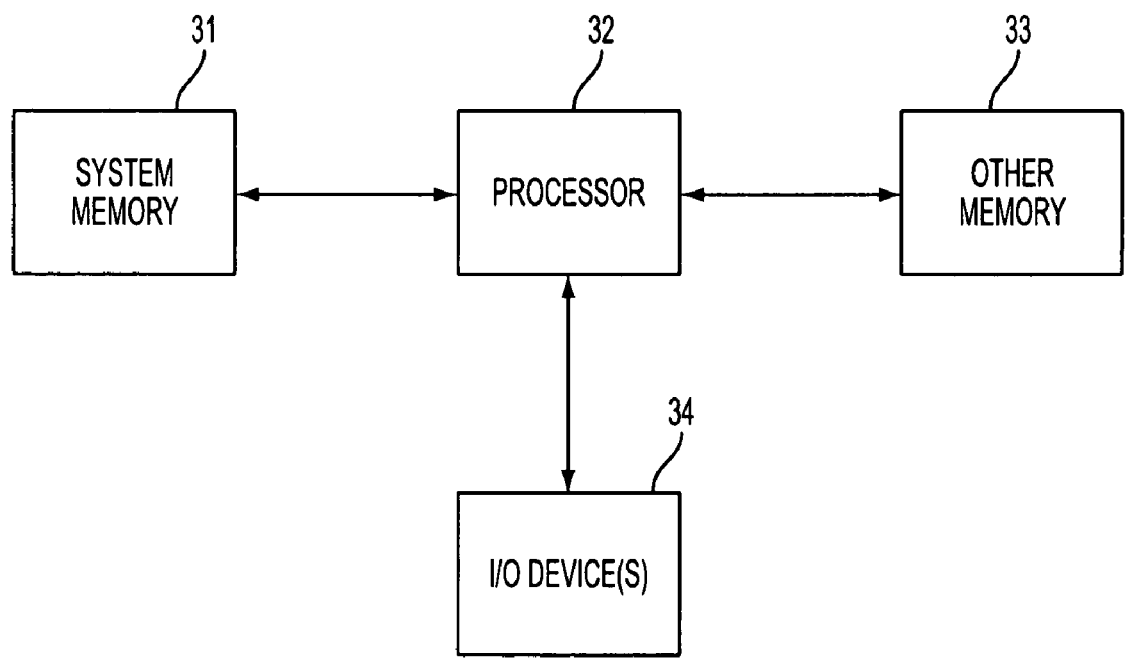
FIG. 3 depicts a further conceptual block diagram of a system that may be used to implement an exemplary embodiment of the invention.

Some embodiments of the invention, as discussed above, may be embodied in the form of software instructions on a machine-accessible medium. Such an embodiment is illustrated in FIG. 3. The computer system of FIG. 3 may include at least one processor 32, with associated system memory 31, which may store, for example, operating system software and the like; The system may further include additional memory 33, which may, for example, include software instructions to perform various applications. System memory 31 and additional memory 33 may comprise separate memory devices, a single shared memory device, or a combination of separate and shared memory devices. The system may also include one or more input/output (I/O) devices 34, for example (but not limited to), keyboard, mouse, trackball, printer, display, network connection, etc. The present invention may be embodied as software instructions that may be stored in system memory 31 or in additional memory 33. Such software instructions may also be stored in removable or remote media (for example, but not limited to, compact disks, floppy disks, etc.), which may be read through an I/O device 34 (for example, but not limited to, a floppy disk drive). Furthermore, the software instructions may also be transmitted to the computer system via an I/O device 34, for example, a network connection; in such a case, a signal containing the software instructions may be considered to be a machine-accessible medium.

Furthermore, the invention may be used in systems that include, but are not limited to, wireless local area networks (WLANs), cellular networks, personal communication networks, etc. The invention may be incorporated into transceivers, network interface cards (NICs), and the like, which are intended to be non-limiting examples.

Figure 4:
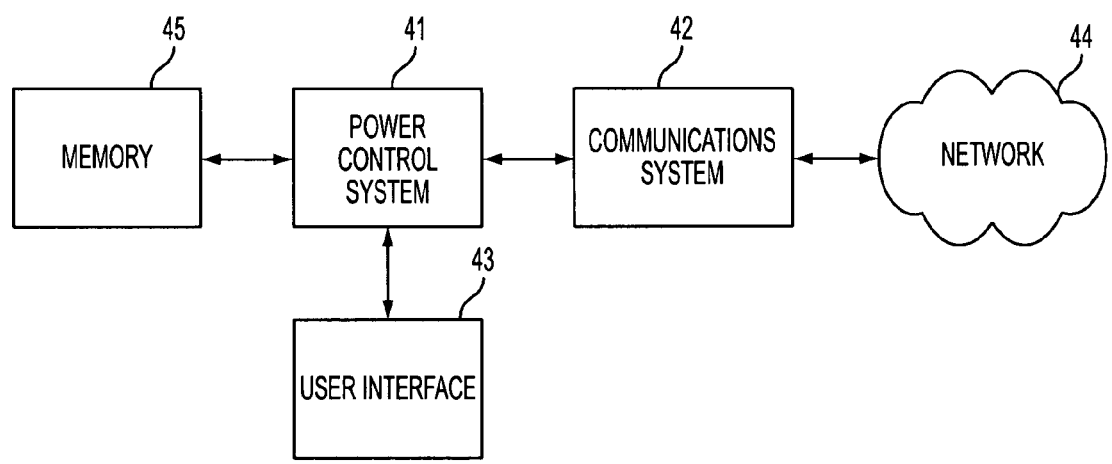
FIG. 4 depicts yet a further conceptual block diagram of a system according to an embodiment of the invention.

FIG. 4 shows an example of how a power control system according to an embodiment of the invention may be interfaced with other components to form a system according to an embodiment of the invention. A power control subsystem 41, comprising a power control system according to an embodiment of the invention, may be interfaced with a communications subsystem 42, which may comprise a transmitter and/or a receiver, and or a transceiver. The communications subsystem 42 may permit the overall system (for example, but not limited to, a mobile device) to interface with a network 44, and it may further include processing capability, memory, and/or logic necessary to accomplish this interfacing. The power control subsystem 42 may be capable of accepting user input via a user interface 43. Such an arrangement may permit a user to enter previously-known values for delays and/or powers, if desired. Furthermore, the power control subsystem 41 may be coupled to at least one memory device 45. Such a memory device 45 may be used, for example, to store pre-computed values, to store software code that may be used in a computer-based embodiment of power control subsystem 41, or for any other suitable purpose.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method, comprising:
   determining a communications interface power requirement;
   determining a system power requirement excluding said communications interface;
   finding an expected relative delay ratio between entering a power saving mode and not entering said power saving mode wherein finding the expected relative delay comprises:
   determining an expected network latency, L;
   determining a delay, D; and
   wherein the expected relative delay ratio is of one of the forms, $$\frac{L+D}{L} \text{ and } \frac{D}{L};$$

determining whether or not to enter said power saving mode based on a comparison between said expected relative delay ratio and a function of said interface power requirement and said system power requirement; and
   determining an expected network latency, L, between sending a request and receiving a response; and
   determining an expected delay, D, introduced by entering said power saving mode.

2. method according to claim 1, wherein said finding comprises:
   determining an expected network latency, L, between receiving two consecutive responses; and
   determining an expected delay, D, introduced by entering said power saving mode.

3. The method according to claim 1, wherein said determining an interface power requirement comprises predetermining and storing an interface power requirement, and wherein said determining a system power requirement comprises predetermining and storing a system power requirement.

4. A machine-accessible storage medium that provides instructions, which when executed by a computing platform, cause said computing platform to perform operations comprising a method of:

determining power requirements relating to a system, exclusive of a communications interface component, and to said communications interface component;

finding an expected relative delay ratio between entering a power saving mode and not entering said power saving mode wherein finding the expected relative delay comprises:

determining an expected network latency, L, between sending a request and receiving a response;

determining a delay, D, introduced by entering said power saving mode; and wherein the expected relative delay ratio is of one of the forms, $$\frac{L+D}{L} \text{ and } \frac{D}{L};$$

and determining whether or not to enter said power saving mode based on a comparison between said expected relative delay ratio and a function of said power requirements.

5. The machine-accessible medium according to claim 4, wherein said determining power requirements comprises:

determining said communications interface power requirement; and determining said system power requirement.

6. The machine-accessible medium according to claim 5, wherein each of said determining a communications interface power requirement and said determining a system power requirement comprises:

predetermining and storing a power requirement.

7. The machine-accessible medium according to claim 4, wherein said function of said power requirements comprises a ratio of said communications interface power requirement to said system power requirement.

8. A machine-accessible medium that provides instructions, which when executed by a computing platform, cause said computing platform to perform operations comprising a method of:

determining power requirements relating to a system, exclusive of a communications interface component, and to said communications interface component;

finding an expected relative delay ratio between entering a power saving mode and not entering said power saving mode wherein finding the expected relative delay comprises:

determining an expected network latency, L, between receiving two consecutive responses; and determining an expected delay, D, introduced by entering said power saving mode; and wherein the expected relative delay ratio is of one of the forms, $$\frac{L+D}{L} \text{ and } \frac{D}{L};$$

and determining whether or not to enter said power saving mode based on a comparison between said expected relative delay ratio and a function of said power requirements.

9. The machine-accessible medium according to claim 8, wherein said determining power requirements comprises:

determining said communications interface power requirement; and determining said system power requirement.

10. The machine-accessible medium according to claim 9, wherein each of said determining a communications interface power requirement and said determining a system power requirement comprises:

predetermining and storing a power requirement.

11. The machine-accessible medium according to claim 8, wherein said function of said power requirements comprises a ratio of said communications interface power requirement to said system power requirement.

* * * * *